June 28, 1960

C. D. GIBSON 2,942,679

MATERIAL HANDLING TRUCK

Filed Feb. 6, 1957

INVENTOR.
CHRISTIAN D. GIBSON
BY

INVENTOR.
CHRISTIAN D. GIBSON

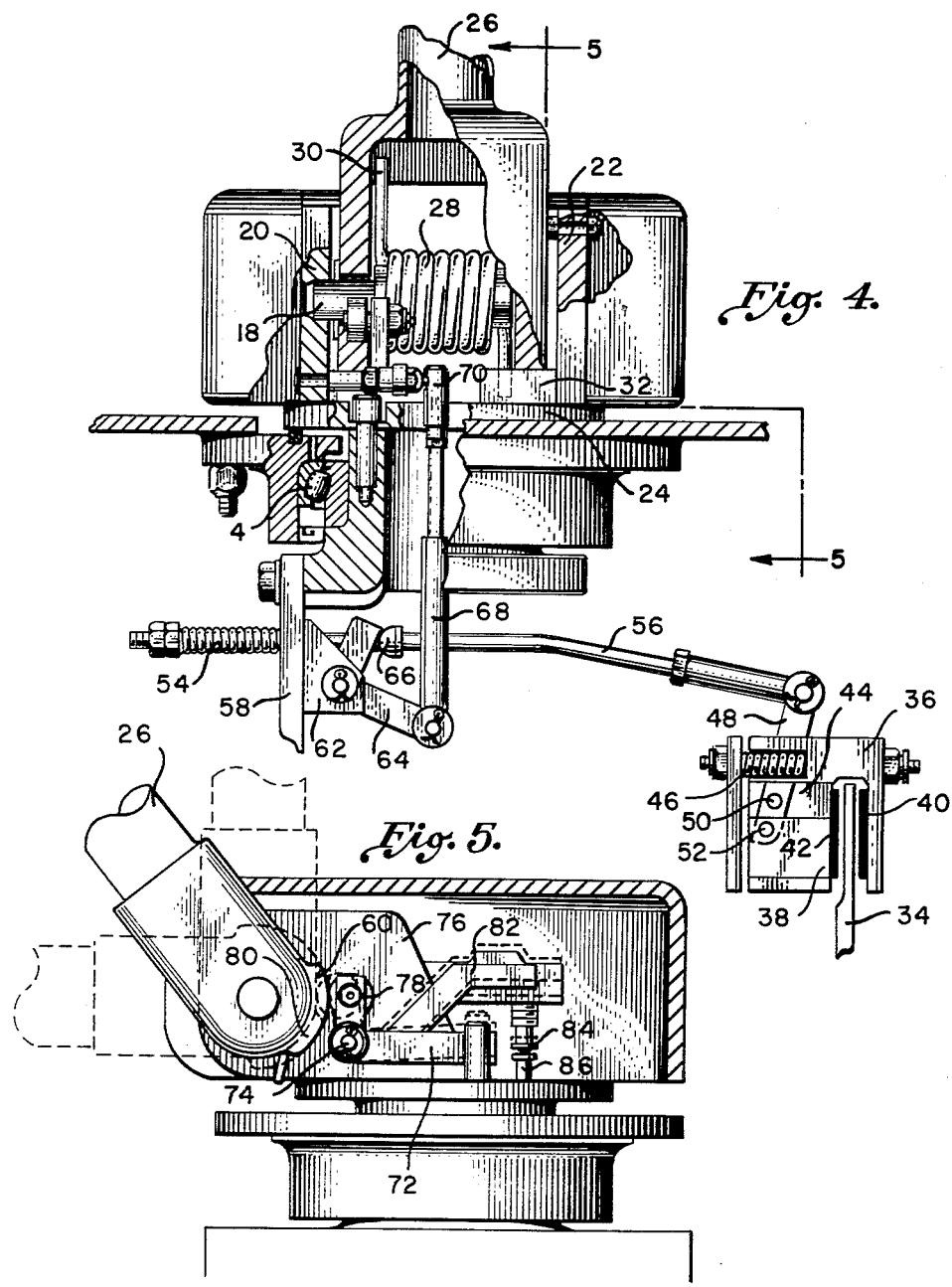

June 28, 1960  C. D. GIBSON  2,942,679
MATERIAL HANDLING TRUCK
Filed Feb. 6, 1957  5 Sheets-Sheet 4

INVENTOR.
CHRISTIAN D. GIBSON
BY

United States Patent Office 2,942,679
Patented June 28, 1960

2,942,679

MATERIAL HANDLING TRUCK

Christian D. Gibson, Greene, N.Y., assignor to The Raymond Corporation, Greene, N.Y., a corporation of New York Filed Feb. 6, 1957, Ser. No. 638,534

6 Claims. (Cl. 180—82)

This invention relates to material handling trucks and more particularly to material handling trucks of the type known in the industry as "Walkies." Walkie trucks, although power propelled and provided with power operated means for picking up and depositing the load to be transported, are not designed to be operator ridden. In order to control the operation of a Walkie truck a combined steering and controlling handle is provided, which is connected to the top of a steering and driving wheel turret and arranged to swing thereon from a normally vertical position to a horizontal position and which, at points between these two positions, may be used both to steer the truck and to control the operation of the propelling means.

A general object of the present invention is to provide a truck of the Walkie type which is more convenient to manipulate, which is lighter in proportion to its load capacity, which has improved means for controlling its operation and which, particularly, has therein novel provisions for insuring the safety of the truck operator. Other objects and important features of the invention, to which reference has not hereinabove specifically been made, will appear hereinafter when the following description and claims are considered in connection with the accompanying drawings in which—

Figure 1 is a perspective view of a truck of the Walkie type embodying the present invention, this view having parts broken away to show parts which otherwise would be concealed;

Figure 2 is an underside perspective view showing particularly the load carrying fork assembly and the means for operating the lifting and supporting rollers at the outer ends of the fork members, this view being split to show on one side the position of the lifting and supporting roller and its operating mechanism when in its lowered collapsed position, and on the other side the position of the roller in its operating mechanism when in its lifting positon;

Figure 4 is a sectional detail showing the connection between the steering and controlling handle and the turret in which the power operated propelling mechanism is located and through which the steering of the truck is effected, this view also showing the connections between the steering and controlling handle and the brake mechanism;

Figure 5 is a section on the line 5—5 of Figure 4, this view showing particularly the operating connections between the brake mechanism and the steering handle through which the "dead man" effect is obtained;

Figure 7:
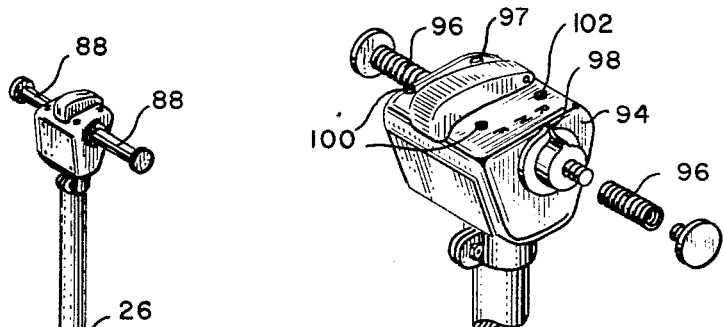
Figure 8:
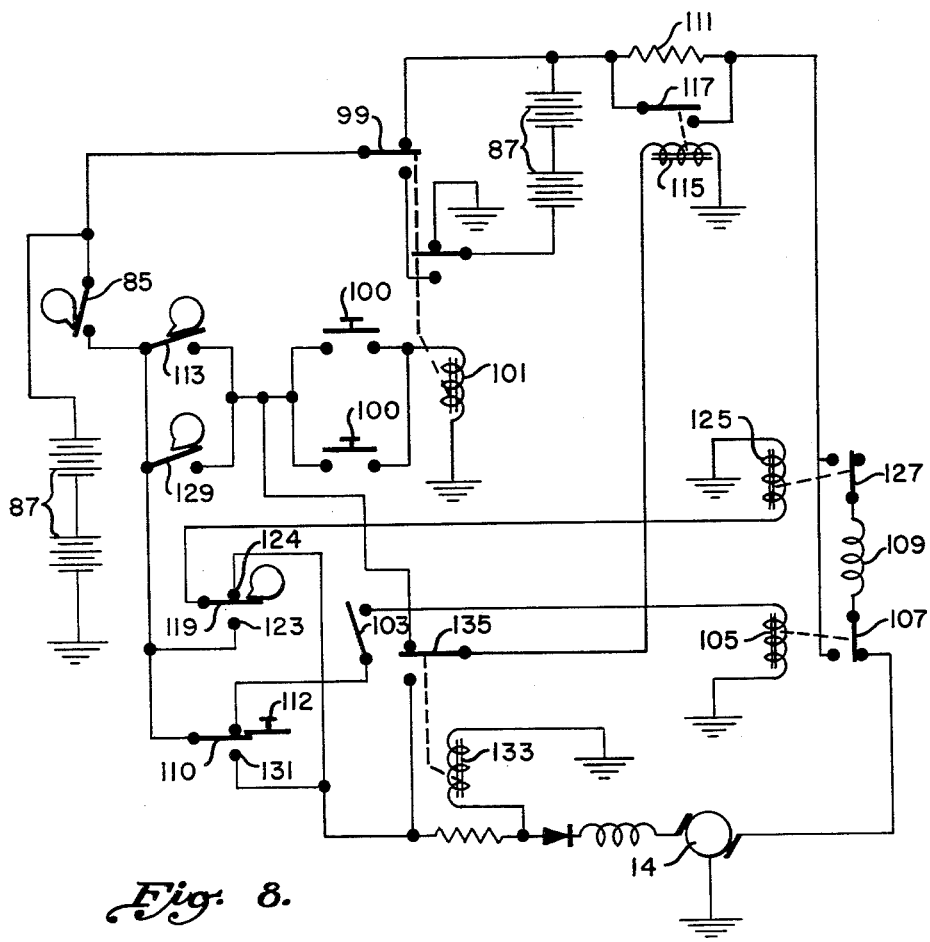

Figure 7 shows a modification of the grip end of the steering and controlling handle, in which flexible grips are provided further to insure the operator's safety, and Figure 8 is a wiring diagram showing the electrical connections between the switches which are located in the grip end of the steering and controlling handle switches and the hydraulic lifting mechanism being omitted for the sake of simplicity and because they are more or less standard equipment.

In referring hereinafter to the interrelation of the various parts of the truck, and also to its direction of movement, it may here be pointed out that the movement of the truck away from the operator or towards the load to be picked up, is a rearward movement and that the handle end and power end of the truck is the forward end thereof.

Figure 1:
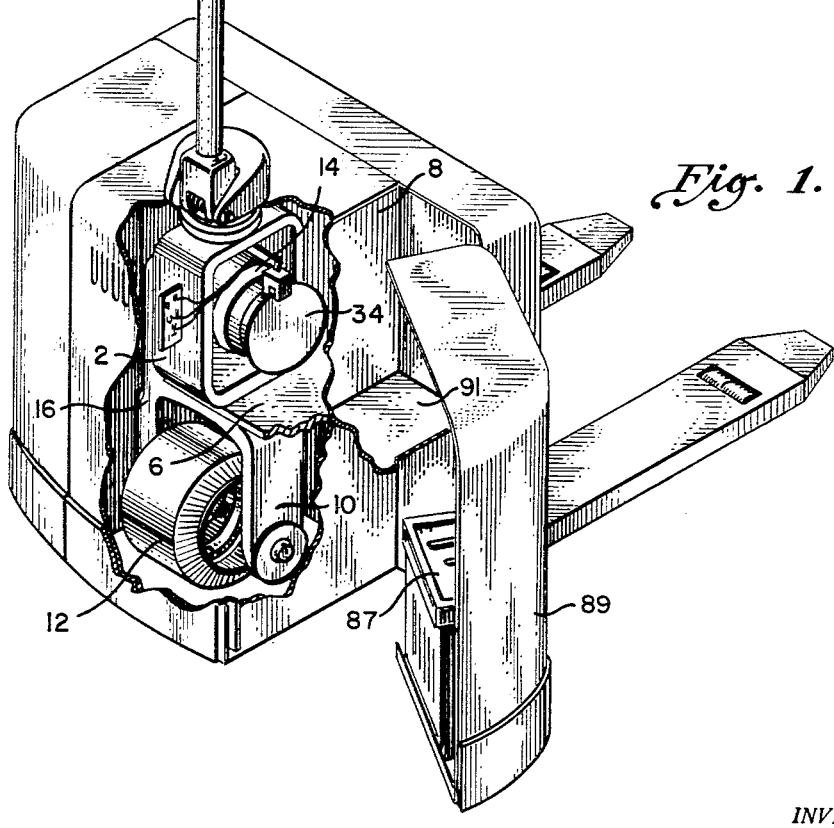

The embodiment of the invention shown in the drawings comprises a turret 2 having upper and lower bearings 4 and 6 and a frame or casing 8, the bearings 6 being not shown in detail herein, but being formed in the cross plate of the housing to which the reference numeral 6 has been attached. Below the bearing plate 6 the turret is forked as shown at 10 and carries bearings for the driving and steering wheel 12, which itself is driven from an electric motor 14 through reducing gears contained in a housing, not shown in detail herein, but located at 16 on the remote side of the fork 10, as this is shown in Figure 1.

Mounted on a shaft 18 carried in upstanding bracket arms 20 and 22 on the upper end 24 of the turret 2 is the steering and controlling handle 26, which is normally urged towards its upright or vertical position by means of a spring 28 coiled about the shaft 18 and having one end 30 engaging the hollow enlarged end of the handle 26 and the other end fixed in a block 32 attached to the upper end 24 of the turret. This spring is strong enough so that, as soon as the operator lets go of the handle, it will swing the handle into its vertical position and cause the application of the brake to the driving mechanism in the manner now to be described.

The brake herein shown operates on a disc 34 carried on the end of the motor shaft remote from the end to which the reducing gear train is connected. As shown in Figure 4, the brake comprises two members 36 and 38, provided respectively with linings 40 and 42, these members being slideable relatively to each other on a fixed part 44 and being urged into their open or non-braking position by a spring 46. Lever 48, fulcrumed at 50 on the fixed part 44 of the frame, is pivotally connected at 52 to the slide 38 of the brake and when swung in a counter clockwise direction in Figure 4 will cause the application of the brake. A stronger spring 54, on a link 56 slideable in a fixed part 58, tends to rock the lever 48 in the direction to apply the brake to the disc 34.

From an inspection of Figure 5 it will be seen that such automatic application of the brake will take place at all times except when the steering and controlling handle 26 is in such a position, between its normal upright position and a horizontal position, that a cam 60, on the lower end of the handle, causes the brake slides to move apart through connections now to be described. Fulcrumed upon a bracket 62 on the frame part 58 is a bell crank 64 having a forked arm engaging a rounded enlargement 66 on the link 56. The bell crank 64 is connected to a vertical slide rod 68, having its upper end 70 connected by a ball and socket joint to one arm 72 of a bell crank fulcrumed at 74 in an upstanding plate 76 on the turret head. The other arm of the bell crank 72 carries a roll 78 which engages a segment cam 60 on the lower end of the steering and controlling handle 26. The extent of the roll engaging edge of the cam 60 is such that when the handle is in its vertical position the roll 78 runs off the end of the cam 60 and permits the spring 54, through the connections above described, to rock the bell crank 64 in a counter clockwise direction and at the same time to swing the lever 48 in a counter clockwise direction to apply the brake to the brake disc 34. There is also connected to the bell crank 72 a second arm 82 which carries a pusher 84 which engages a push button 86 constituting the actuating member of a dead man switch, which when released by the upswinging of the bell crank 72 will open the motor operating circuit and thus prevent the operation of the drive motor.

A like application of the brake and breaking of the motor operating circuit also take place when the steering and controlling handle 26 has been swung into horizontal position and the roll 78 again rides off the operating edge of the cam 60. From the foregoing description it will be seen that the cam 60 is so positioned that unless the handle is swung to a position in the intermediate range between its vertical and horizontal positions the brake is automatically applied to the disc 34 and the power circuit broken and the truck cannot be operated, even though the various usual control switches be closed.

Figure 6:
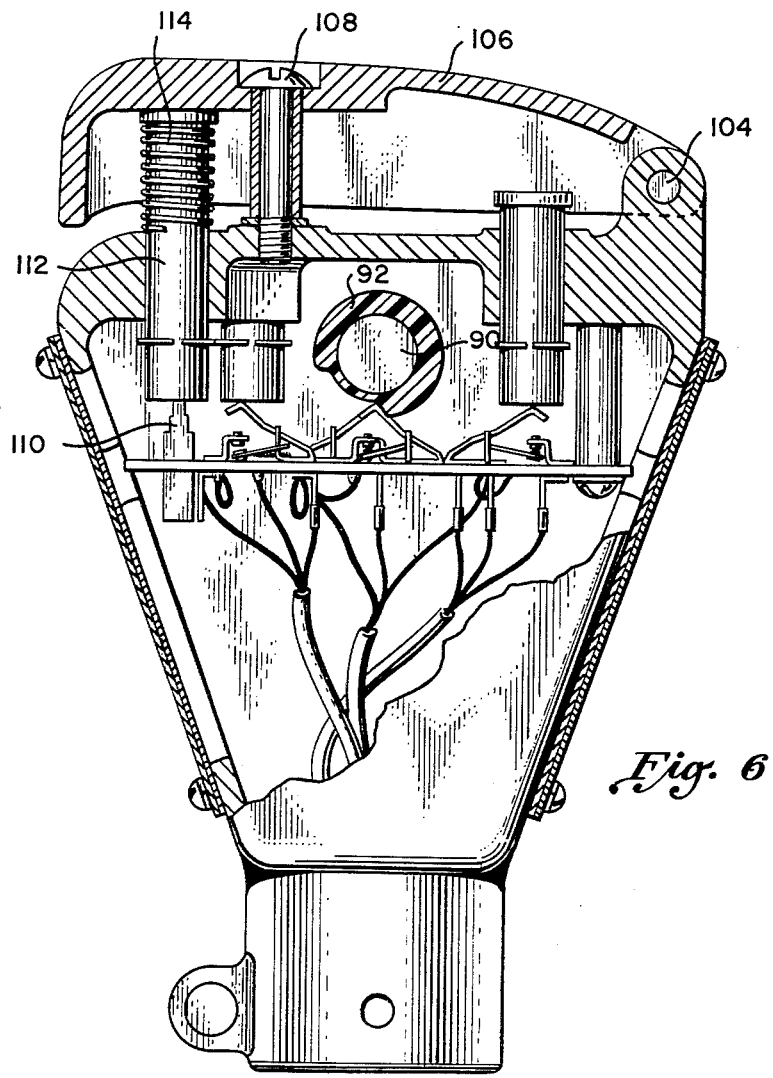
Figure 6 is a section through the grip end of the steering and controlling handle, this view showing particularly the cam shaft through which the actuation of the motor controlling switches is brought about and also the safety switch arranged to be operated by mere contact with the operator's body.

From an inspection of Figures 1 and 6 it will be seen that the outer end of the steering and controlling handle 26 is provided with right and left hand grips 88 connected to a common switch operating cam shaft 90 having thereon a switch engaging cam 92 formed of non-conducting material. The shaft 90 is mounted in bearings in a housing 94 in which the various truck propulsion and load lift controlling switches are located. By turning the shaft 90, as a handle 88 is gripped by a hand of the operator, the motor control switches in the housing 94 may be successively closed to effect the actuation of the driving motor and the control of its speed of operation. In Figure 1 the grips 88 are shown as corrugated rigid members which can be easily gripped to turn the shaft 90 as or after the operator swings the handle from its vertical position and its horizontal position. In the interests of safety, it is sometimes advantageous to use the construction shown in Figure 7 in which coil spring grips 96 are substituted for the rigid grips 88 of Figure 1. It will be noted that the shaft 90 which carries the switch operating cam 92 is provided with an indicator 98 which points to the Letter N on the end of the housing 94 when the shaft 90 is turned to bring the switch operating cam into neutral position, that is, a position in which none of the switches are closed by it. A spring on the shaft 90, not shown on the drawings, tends to maintain the shaft 90 and cam 92 in neutral position.

The switches in the housing 94 which are operated by the turning of the cam shaft 90 through the hand grips 88 are so arranged that when the shaft 90, as shown in Figure 6, is turned in a counter clockwise direction, switches are closed in succession which serve to actuate the motor, the first switch engaged by the cam 92 on the shaft 90 serving to actuate the motor at its lowest speed, and the second switch closed by the cam 92, serving, through a relay, to short-circuit resistance and cause the motor to be operated at its second speed. The motor is turned by this switch closing action in a direction to propel the truck forward.

If the shaft 90, as shown in Figure 6, be turned in a clockwise direction, the cam 92 will serve to close in succession two switches; the first of which actuates the motor to propel the truck in rearward direction at its lowest speed, and the second of which short-circuits resistance to increase the speed of operation of the truck in the rearward direction to its intermediate or second speed.

To actuate the motor to propel the truck at its highest or third speed, the operator may engage either or both push buttons 100 in the end plate of the casing of the housing 94. These push buttons serve to close a switch, which, as hereinafter pointed out, connects a plurality of batteries in series instead of in parallel thereby increasing the voltage to the motor with a resultant increase in the speed of operation.

The truck herein shown is designed to operate on four automobile type batteries which are located on each side of the central housing 8, one battery 87, as shown at the right in Figure 1, being carried in a hollow swinging door 89, hinged to a lateral extension of the rear plate of the housing 8 and a second battery, not shown, being carried upon a shelf 91 carried by the side plate of the housing 8, the two batteries when the door 89 is in closed position, as shown at the left in Figure 1, being located one above the other and completely enclosed. The construction on the left hand side of the casing or housing 8 is the same, like reference numerals being used for like parts. It will be seen that if each battery 87 be a 6-volt battery and the upper and lower batteries in each of the hollow doors 89 be connected in series and the two sets of batteries be connected in parallel for the first and second speeds of operation of the motor, a 12 volt current will then be supplied to the motor. If the two pairs of series connected batteries be all connected in series instead of in parallel, the increased voltage required to operate the motor at its highest speed will then be supplied to the motor field, this speed being attained when the hand grip 88 or the similar hand grip 96 has been turned to its second speed position and the operator has then pushed one or both push buttons 100, which are so located as to be within convenient reach of his thumb or thumbs.

Pivoted at the end of the housing 94 to rock or swing about a pivot shaft 104 is a switch operating member 106 limited in its outward movement by the head of a screw 108 received in a recess or socket in the top face of the member 106. This switch operating member 106 is the safety switch control hereinabove referred to and operates to close a reversing switch 110 through a push button 112, normally held in an open switch position by a spring 114. This switch operating member, as hereinafter more fully set forth, when depressed by contact of the operator's body operates to do two things: First, it short-circuits all existing circuits supplying operating current to the motor, and establishes a motor reversing circuit to cause the truck to be immediately reversed, thus preventing its continued movement toward the operator.

Figure 2:
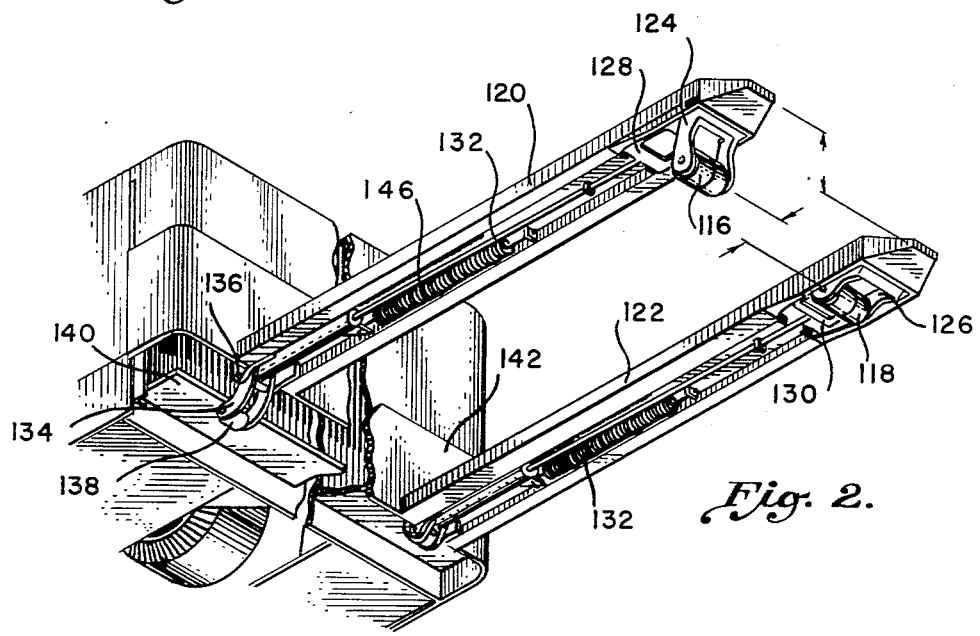

The description so far has related to the tractor part of the truck, and to the improved mechanism for controlling the operation thereof. It will be understood that the loadlifting and carrying mechanism includes the supporting rollers 116 and 118, which when the fork members 120 and 122 are in their lowered position, will be collapsed into the position shown at the right in Figure 2 and that, when swung into load supporting position they will be rocked rearwardly into the position shown at the left in Figure 2. The rollers 116 and 118 are carried in bell crank supports 124 and 126 which have their short, rearwardly extending arms connected by yokes 128 and 130 to rods 132. These rods are connected at their front ends to bell cranks 134 fulcrumed on brackets 136 on the underside of the fork members 120 and 122, the bell cranks having on their lower arm rolls 138 which engage the under surface of a ledge 140 fixed to the rear of the main frame or casing so that when the forks 120 and 122, which are fixed to and are slideable with the plate 142, in turn connected to a carriage 144, move up over the main frame of the machine as shown at the left in Figure 2, the rocking of the bell cranks 134, caused by their engagement with the under surface of the ledge 140, will pull the rods 132 forwardly and cause the bell cranks 124 and 126 to swing the rollers 116 and 118 rearwardly into their load lifting position, as shown at the left in Figure 2.

Springs 146, connected at one end to the fork arms 120 and 122 and at the other end to the rods 132, are tensioned when the rods move forwardly to effect the load lifting action and accordingly move the rods again rearwardly and collapses the lifting mechanism when the slide 144, to which the load-supporting fork arms 120 and 122 are connected, is released by the hydraulic lifting mechanism.

Figure 3:
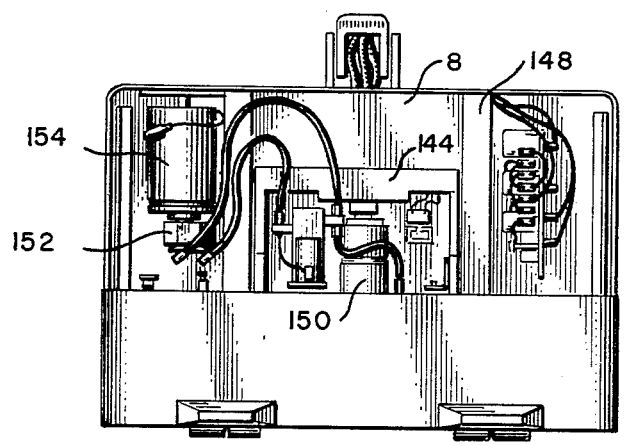
Figure 3 is a rear elevation of the truck, with the cover plate removed to show the hydraulic mechanism through which the lifting of the load is brought about and also to show details of the slideable connections between the front or tractor part of the truck and the rear or load lifting part thereof.

As hereinabove pointed out, the lifting of the load is effected hydraulically. The slide or carriage 144 has guide rollers, not shown, which travel in guide channels 148 on the rear face of the housing or casing 8 and the lifting of the load through the fork-carrying slide or carriage 144 and the rear wheel or roller rocking connections hereinabove described is effected by means of a hydraulic jack, the cylinder 150 of which is shown on Figure 3, the cylinder 150 being supplied with hydraulic fluid by the usual hydraulic pump 152 operated by the motor 154.

In Figure 8 is shown a wiring diagram of the circuits which control the operation of the motor 14 and of the manner in which these circuits are established through operation of the switches in the housing 94 at the end of the combined steering and control handle 26. This wiring diagram also shows the deadman switch 85, which is not located in the housing 94, but is arranged to be operated by the position of the cam 60 at the lower end of the handle 26 through a push button 86 normally urged toward open circuit position. The batteries 87 are shown as normally arranged in two pairs, each pair being connected in series, the two pairs normally connected in parallel and the switch 99, operated by the push button 100, serving to connect the two pairs of batteries in a series of four batteries to give a higher voltage for high speed. It will be seen that the switch 99, which is normally in position to maintain a parallel connection between the two pairs of batteries 87, is operated through a relay 101 to put the two pairs of batteries in series.

With the handle 26 in a position to close the dead man switch 85, if the shaft 90 be turned to the first switch actuating position for the forward speed, that is, so that it closes switch 103, it will establish a circuit through the relay 105 operating switch 107 to establish a circuit through the motor field 109 that will cause the motor to drive the truck forward. The circuit thus established will include the resistance 111 which will insure starting at low speed.

Further turning of the shaft 90 through the hand grip 88 in the counter clockwise direction in Figure 6, will close the switch 113 and establish a circuit through the relay 115 which will close the switch 117 to short-circuit the resistance 111, thus increasing the flow of current through the motor field 109 and increase the speed of the motor. As above pointed out, the operator may now obtain high speed by pushing either of the push buttons 100. Turning of the shaft 90 in the clockwise direction in Figure 6 will cause the motor to be energized to drive the truck in the reverse or rearward direction. This will be brought about by movement of the switch member 119 from the contact 124 to the contact 123 thus establishing a circuit through the relay 125 to operate the switch 127 to close a circuit through motor field 109 in the reverse direction, thus energizing the motor to drive the truck rearwardly. It will be seen that in the first position of the hand grip thus described the circuit will include the resistance 111. To obtain the second speed in reverse, further turning of the hand grip 88 and the shaft 90 will cause the closing of the switch 129, which will establish a circuit through the relay 115 thus short-circuiting the resistance 111. The third speed in reverse may be obtained in the same manner as the third speed forward by depressing either one of the push buttons 100.

We now come to the circuit established when the safety switch is closed. As hereinabove pointed out, this switch is operated when the switch operating member 106 engages the body of the operator or any object that may be in the path of the member when the truck is travelling forward. The push button 112 operates to depress the switch member 110 to engage the contact 131 and establish a circuit through the relay 125 and through the relay 133 closing the switch 135 to short-circuit the resistance 111 through the relay 115. It will be seen that this immediately energizes the motor to drive the truck rearwardly at second speed, thus, relieving the pressure on the operator, if the contact has been made with his body.

From the foregoing description the operation of the truck so far as control of its forward and rearward movements is concerned will readily be understood. When as a result of its movement it has been brought about to a point where a load is either to be picked up or deposited, the movement of the truck will be stopped by a release of the hand grip and the operation of the lifting mechanism will be brought about. It will be seen that there are two push buttons 97 and 102 on the top plate of the housing 94, the push button 97 being arranged to operate a switch, not shown, which actuates the hydraulic mechanism to effect the lifting of the load and the push button 102 being arranged to close a switch that effects the release of the hydraulic fluid from the jack cylinder 150 and the lowering of the load to deposit it in the desired location. As hereinabove pointed out, the circuits controlled by the push button switches 97 and 102 are not shown on the wiring diagram in Figure 8 since they are substantially standard equipment for such purposes.

From an inspection of Figure 1 it will be noted that the arrangements for supporting the automobile type batteries are such as to provide convenient access to them for servicing them. It will be seen that when the hollow door 89 is open the lower battery is moved out from beneath the shelf 91 which supports the upper battery, and thus the tops of both batteries are exposed by the mere opening of the door.

What is claimed as new is:

1. In a material handling truck, the combination with a swivel-mounted, an electric motor driven combined driving and steering wheel, a dead-man switch mounted on said swivel and constantly urged to open position, a steering handle also mounted on said swivel to swing between upright and horizontal dead-man switch-releasing positions and provided with means for closing said switch during a substantial part of the vertical arc of swing of said handle, said handle also having thereon manually controlled means, operable when said handle is between its dead-man switch-releasing positions, to control the truck propelling operations of said power-driven wheel, a normally open motor-reversing circuit which is separately controllable, and an emergency switch for closing said circuit and forthwith energizing said motor to drive said truck rearwardly, said motor-reversing circuit being arranged to short circuit and render inoperative said manually controlled means, and said emergency switch being independent of said manually controlled means and having, at the extreme front end of said handle, switch operating means movable on impact with a person or object to close said switch.

2. A material handling truck according to claim 1 in which provision is made for a plurality of forward and reverse speeds and in which the emergency switch is so connected to the motor as to effect a reversal at better than the usual starting speed.

3. A material handling truck according to claim 1 in which the emergency switch comprises a swingable switch-closing member of substantial surface area swingable about a transverse pivot at one side of the handle spring urged into projected position at the extreme end of the handle and is therefore designed to require comparatively light body pressure for its operation.

4. A material handling truck according to claim 1 in which the manually controlled means for controlling the truck propelling operations of the power-driven wheel comprise transversely flexible hand grips at the sides of the supplemental controlling means.

5. A material handling truck having, in combination, a frame, supporting wheels therefor, including an electric motor-driven traction wheel swivel-mounted in said frame for steering, a combined steering and controlling handle hinged to the top of said swivel to swing thereon between upright and horizontal positions and to swing therewith about the swivel axis to steer the truck, manually operable switches on said handle for controlling the direction and speed of turning of said motor-driven traction wheel and a normally open motor-reversing circuit which is separately controllable, and an emergency switch for closing said circuit and forthwith energizing said motor to drive said truck rearwardly, said motor-reversing circuit being arranged to short circuit and render it inoperative said manually controlled means, and said emergency switch being independent of said manually controlled means and having, at the extreme front end of said handle, switch operating means movable on impact with a person or object to close said switch.

6. A material handling truck according to claim 1 in which the emergency switch operating means presents an impact receiving face of such transverse area and rounded shape as to insure switch closing operation of said means at substantially any angle of impact incidence of a person or object in the path of forward travel of the handle.

References Cited in the file of this patent

UNITED STATES PATENTS

| | | |
|---|---|---|
| 2,254,331 | Stuebing | Sept. 2, 1941 |
| 2,399,605 | Schroeder | Apr. 30, 1946 |
| 2,645,297 | Wenneberg et al. | July 14, 1953 |

FOREIGN PATENTS

| | | |
|---|---|---|
| 247,146 | Switzerland | Nov. 17, 1947 |